US006922640B2

(12) United States Patent
Vezzu et al.

(10) Patent No.: US 6,922,640 B2
(45) Date of Patent: Jul. 26, 2005

(54) METHOD FOR THE ESTIMATING OF THE RESIDUAL SERVICE LIFE OF AN APPARATUS

(75) Inventors: Guido Vezzu, Pfungen (CH); William Gizzi, Zürich (CH)

(73) Assignee: Sulzer Markets and Technology AG, Winterthur (CH)

( * ) Notice: Subject to any disclaimer, the term of this patent is extended or adjusted under 35 U.S.C. 154(b) by 0 days.

(21) Appl. No.: 10/733,130

(22) Filed: Dec. 10, 2003

(65) Prior Publication Data

US 2004/0122621 A1 Jun. 24, 2004

(30) Foreign Application Priority Data

Dec. 18, 2002 (EP) .......................................... 02102786

(51) Int. Cl.[7] .......................... G06F 15/00; G06F 17/00

(52) U.S. Cl. .......................... 702/34; 700/90; 702/182; 702/183

(58) Field of Search .............................. 702/33–34, 42, 702/44, 79, 130, 132, 136, 177, 178, 182–185, 189; 700/54, 90, 170, 289; 73/1.08, 1.09, 1.14, 1.68, 1.84, 1.87, 64, 49, 119

(56) References Cited

U.S. PATENT DOCUMENTS 6,542,853 B1 * 4/2003 Murakami et al. .......... 702/183
6,671,647 B2 * 12/2003 Ishii et al. .................. 702/136
2002/0107589 A1 8/2002 Grimm

FOREIGN PATENT DOCUMENTS

WO WO 02/18879 A 3/2002

* cited by examiner

*Primary Examiner*—John Barlow
*Assistant Examiner*—John Le
(74) *Attorney, Agent, or Firm*—Townsend and Townsend and Crew LLP

(57) ABSTRACT

A method is proposed for the estimating of the residual service life of an apparatus which is subjected to wear during operation steps. For at least one characteristic parameter (T) which is sensitive to the wear (V), a relationship is determined to a time parameter (A) which is representative for the operating period, and a limit value (G) is fixed for the characteristic parameter (T) which gives the maximum permitted wear. A code field (KF) is established which gives a relationship between the characteristic parameter (T), the time parameter (A) and the wear (V), actual values are determined for the characteristic parameter (T) in dependence on the time parameter (A) with the aid of data obtained by a measurement, and the instantaneously present wear (V) is determined from the actual values with reference in each case to the code field (KF). Starting from the instantaneous actual value of the characteristic parameter (T), a determination is made by means of extrapolation to the limit value (G) of the end value of the time parameter (A) for which the maximum permitted wear is reached, and the residual service life (RL) is estimated by a comparison of this end value with the value for the time parameter which belongs to the instantaneously present wear.

10 Claims, 6 Drawing Sheets

METHOD FOR THE ESTIMATING OF THE RESIDUAL SERVICE LIFE OF AN APPARATUS

BACKGROUND OF THE INVENTION

The invention relates to a method for the estimating of the residual service life of an apparatus which is subject to wear during operation. The invention further relates to the use of such a method for service planning.

For many apparatuses, such as turbines or jet engines of airplanes, the wear of or at important components is the main reason for the limited service life, with "service life" usually meaning the period of time or the operating period between two standard audits. Wear can manifest itself by changes in the mechanical properties of components, which is due, for example, to friction, heat or fatigue. These changes at the components also bring about a changed behavior of the whole apparatus with unchanged operating conditions. It is therefore necessary to carry out audits or service work on the apparatus at regular intervals.

Methods known today for the planning of such service work are usually based on purely time-defined service intervals; that is, a fixed time interval is set for the service life between two audits. For safety reasons, very conservative approximations are assumed for the service life already used up. It is clear that such purely time-supported methods do not result in an optimum utilization of the possibilities of the apparatus, because the wear which actually occurred, which is also influenced by the specific operating conditions and environmental conditions, is not taken into account. To increase the efficiency of utilization of such apparatuses, for example airplane engines, it is therefore desirable to have a more realistic estimate available for the residual service life, in which the actual operating conditions and environmental conditions are also taken into account in order thus to make possible a more efficient and more economic service planning.

SUMMARY OF THE INVENTION

The present invention is directed to this object. A method should therefore be provided for the estimating of the residual service life of an apparatus in which the specific operating conditions, and thus the service life of the apparatus effectively, are taken into account.

In accordance with the invention, a method is therefore provided for the estimating of the residual service life of an apparatus which is subject to wear during operation, having the following steps:

a) for at least one characteristic parameter which is sensitive to the wear, a relationship is determined to a time parameter which is representative for the operating period;

b) a limit value is fixed for the characteristic parameters which gives the maximum permitted wear;

c) a code field is established which gives a relationship between the characteristic parameter, the time parameter and the wear;

d) actual, values are determined for the characteristic parameter in dependence on the time parameter with the aid of data obtained by a technical measurement;

e) the instantaneously present wear is determined from the actual values with reference in each case to the code field;

f) starting from the instantaneous actual value of the characteristic parameter, a determination is made by means of extrapolation to the limit value of the end value of the time parameter for which the maximum permitted wear is reached; and g) the residual service life is estimated by a comparison of this end value with the value for the time parameter which belongs to the instantaneously present wear.

In the method in accordance with the invention, the wear is quantified with reference to at least one characteristic parameter which is sensitive with respect to the wear. A code field is established for the apparatus which describes the relationship between the characteristic parameter, the time parameter and the wear. In the case of only one characteristic parameter, this code field can be represented as an area in a three-dimensional space which space is set up by the characteristic parameter, the time parameter and the wear.

Data are detected at the apparatus in a technical measurement from which an actual value can be determined for the parameter in dependence on time. A determination can then be made with reference to the code field as to how far the wear has progressed in a quantitative manner, for example in per cent. The residual service life can then be estimated by extrapolation to the maximum permitted limit value for the characteristic parameter.

The method in accordance with the invention thus takes the service life into account which has been actually and effectively used up in order to estimate the residual service life starting from this. Not only the time parameter is thus taken into account, but in addition, the operation conditions, and optionally the environmental conditions, are taken into account under which the apparatus was operated up to the present point in time. This operation-dependent estimate of the residual service life, which takes the history of the apparatus into account, makes a substantially more efficient utilization of the apparatus possible, because services are only carried out when they are actually necessary. The reliable prediction of the wear development thus makes a condition-based service planning possible.

The residual service life is preferably determined for different stages in the life cycle; that is, as the life is progressively used up—measured by the time parameter—the residual service life is repeatedly re-estimated.

In a particularly preferred embodiment, the code field is established with the aid of a-priori knowledge of the wear behavior. Since apparatuses such as airplane engines (jet engines) represent very complex systems, it is as a rule only possible—if at all—with a fairly great effort to carry out a sufficiently precise physical or deterministic modelling of the apparatus. It is therefore preferred to use a-priori know-how for the establishing of the code field. The experience, observations or also measurements which have been collected at the same or similar apparatuses are used to describe the qualitative and/or quantitative behavior of the characteristic parameter as the wear progresses. The establishing of the code field is made substantially simpler by the use of such a-priori knowledge. Furthermore, the use of the a-priori knowledge normally results in the code field describing the apparatus better or more exactly.

The a-priori knowledge preferably includes the qualitative and/or quantitative course of wear curves which indicate the relationship between the characteristic parameter and the time parameter.

Since the a-priori know-how usually includes specifications available in verbal form, the code field is particularly preferably established by means of a linguistic fuzzy model. A purely qualitative model, for example, can thereby be generated to determine the wear, the model then being adequately optimized with respect to its quantitative properties on the basis of measured life cycles.

It has also proved advantageous in practice for the code field to be modified with reference to measurement data or on the basis of plausibility observations. Such plausibility observations, for example, have proven to be very useful to model certain marginal regions of the code field which correspond to states which the real apparatus seldom reaches.

It is furthermore preferred for the data obtained by a technical measurement each to be subjected to a filtering or to an averaging for the determination of the actual values for the characteristic parameter. The data obtained by a technical measurement are frequently overlaid by a noise or another interfering value such that their direct use, in particular with fuzzy models, does not allow any sound statement with respect to the degree of wear.

For the determination of the actual values, a model is established, preferably with the aid of a plurality of sets of data obtained by a technical measurement, with which an actual value is determined for the characteristic parameter.

The method in accordance with the invention is in particular suitable for the estimating of the residual service life of an engine, in particular of an airplane engine.

The method in accordance with the invention is particularly well suited for the service planning, in particular of an airplane or of a plurality of airplanes (fleet management).

The invention will be described in more detail in the following with reference to an embodiment and to the drawing.

DESCRIPTION OF THE PREFERRED EMBODIMENTS

The method in accordance with the invention is explained in the following with reference to a jet engine of an airplane. The engine stands as a representative example for an apparatus which is subject to wear during operation and for which an estimate of the residual service life should be made. The invention is naturally not restricted to this application, but is also suitable in basically the same manner for other apparatuses such as land-based turbines, flow machines or other mechanical systems which are subject to wear during operation and therefore have to be serviced.

The term "service life" means the interval between two regular audits or services; that is, the degree of wear is evaluated as "new" directly after the service.

The change in the gas discharge temperature of the engine is selected as the characteristic parameter which is sensitive with reference to the wear of the airplane engine. The temperature change is designated by T in the following.

The number of flights is selected as the time parameter which is representative for the operating time or the service life and is designated by A in the following. Other time parameters would naturally also be suitable, for example the number of operating hours.

The wear V is described by a number from the interval from zero to one, where V=0 means "new", no wear has yet occurred, and V=1 means "used", the permitted wear limit has been reached. A wear of V=0.6 therefore means, for example, that the degree of wear amounts to 60% of the maximum permitted wear.

A temperature increase of 40 K is chosen as the limit value G for the temperature change T which gives the reaching of the maximum permitted wear. This value is based on experience which is brought in as a-priori knowhow.

Figure 1:
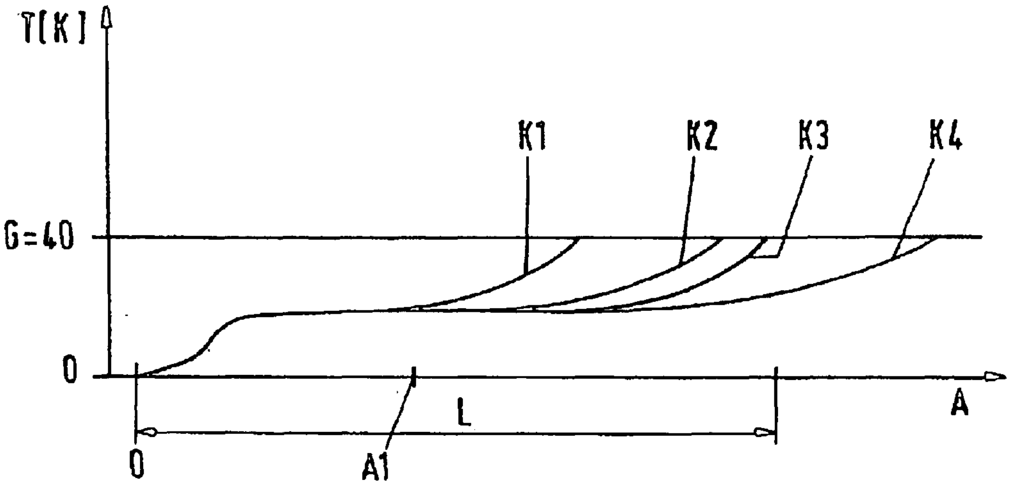
FIG. 1 shows typical wear curves for an airplane engine.

FIG. 1 shows a plurality of typical wear curves K1–K4 which each give a possible relationship between the temperature change T as the characteristic parameter and the number A of flights as the time parameter. Such wear curves represent a-priori knowledge which is used in the present embodiment for the establishing of the code field. The wear curves are based on experience or data which are obtained by a technical measurement and have been made on the same or similar engines.

Furthermore, the limit value G=40 K is drawn in for the temperature increase as well as an interval L which gives a typical life cycle for such an engine.

It can be recognized that the curves K1–K4 admittedly all look different, but show the same behavior qualitatively. At the start of the life cycle, which begins at A=0 and T=0, a steep climb of the wear curves can first be recognized; a plateau follows at which the temperature increase hardly changes; and towards the end of the life cycle a steeper climb in the temperature increase can again be observed. All wear curves end at T=40 K, that is, on reaching the limit value G.

A possibility of quantifying the wear consists of the fact of norming the path integral over the whole wear curve to one. Then the path length for each point on the wear curve defines exactly the corresponding wear. If, for example, A1 flights have been covered, the quantified wear results from the path integral over the wear curve from 0 to A1.

The problem is, however, that for a given engine the wear curve obtained by a technical measurement is only known at the end of its lifetime. Expressed differently: it is not known for a new, i.e. freshly serviced, engine along which of the many different wear curves it will move during its life cycle.

Expressed in somewhat simplified terms, in the embodiment of the method in accordance with the invention described here, the estimate of the residual service life is improved in the course of the progressive using up of the service life in that the prediction is constantly (that is, for example, after every flight) matched to the correct wear curve.

From the viewpoint of an input/output model, the characteristic parameter and the time parameter which measure the service life used up to date are to be used as inputs and the wear as the output as the required and adequate information for the estimate of the residual service life.

In the method in accordance with the invention, a code field KF (see FIG. 3) is first established which gives a relationship between the characteristic parameter (here the temperature increase T), the time parameter (here the number of flights A) and the wear V.

This code field is preferably established with the aid of a-priori know-how, that is, for example using wear curves K1–K4, as are shown in FIG. 1.

A linguistic fuzzy model (MAMDANI model) is particularly preferably used for the conversion of this a-priori knowledge. Since such fuzzy models or the fuzzy logic per se are sufficiently known to the person skilled in the art, it will only be explained briefly here how the code field KF is established with the aid of a linguistic fuzzy model in the embodiment of the method in accordance with the invention.

The following information is available as a-priori know-how for the linguistic fuzzy model in the embodiment described here: knowledge of the qualitative and quantitative course of wear curves (see FIG. 1); additional demands on the prediction in marginal areas.

Figure 2:
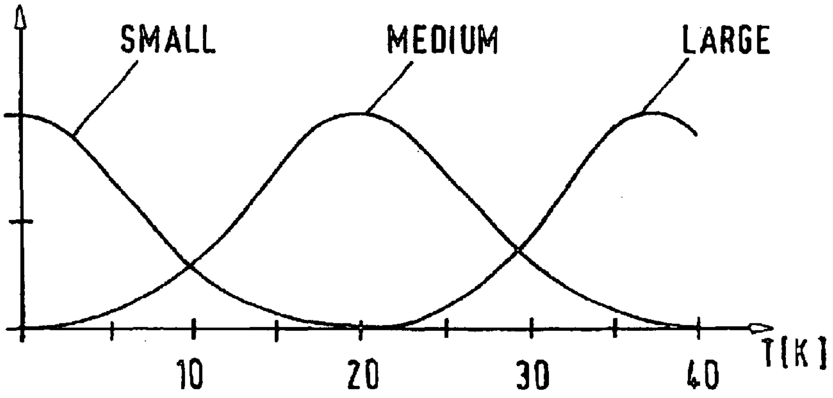
FIG. 2 shows membership function of a fuzzy set.

The temperature increase T and the service life used up to date, measured by the number A of flights, serve as input values, the wear V as the output value. Each of the input and output values is characterized by a fuzzy set. As an example, FIG. 2 shows the membership function of the fuzzy set for the input value temperature increase T. The linguistic values "small", "medium" and "large" are provided for the linguistic variable T.

The linguistic values "few", "many", "limit" are provided for the input value A "number of flights" and the linguistic values "new", "as new", "used", "used up" are provided for the output value "wear" V.

Subsequently, the rules are defined using the fuzzy set; in the specific case, these include the following four rules:

IF (T is small) AND (A is few) then (V is new)

IF (T is small) AND (A is many) then (V is as new)

IF (T is medium) AND (A is many) then (V is used)

IF (T is large) AND (A is limit) then (V is used up).

Figure 3:
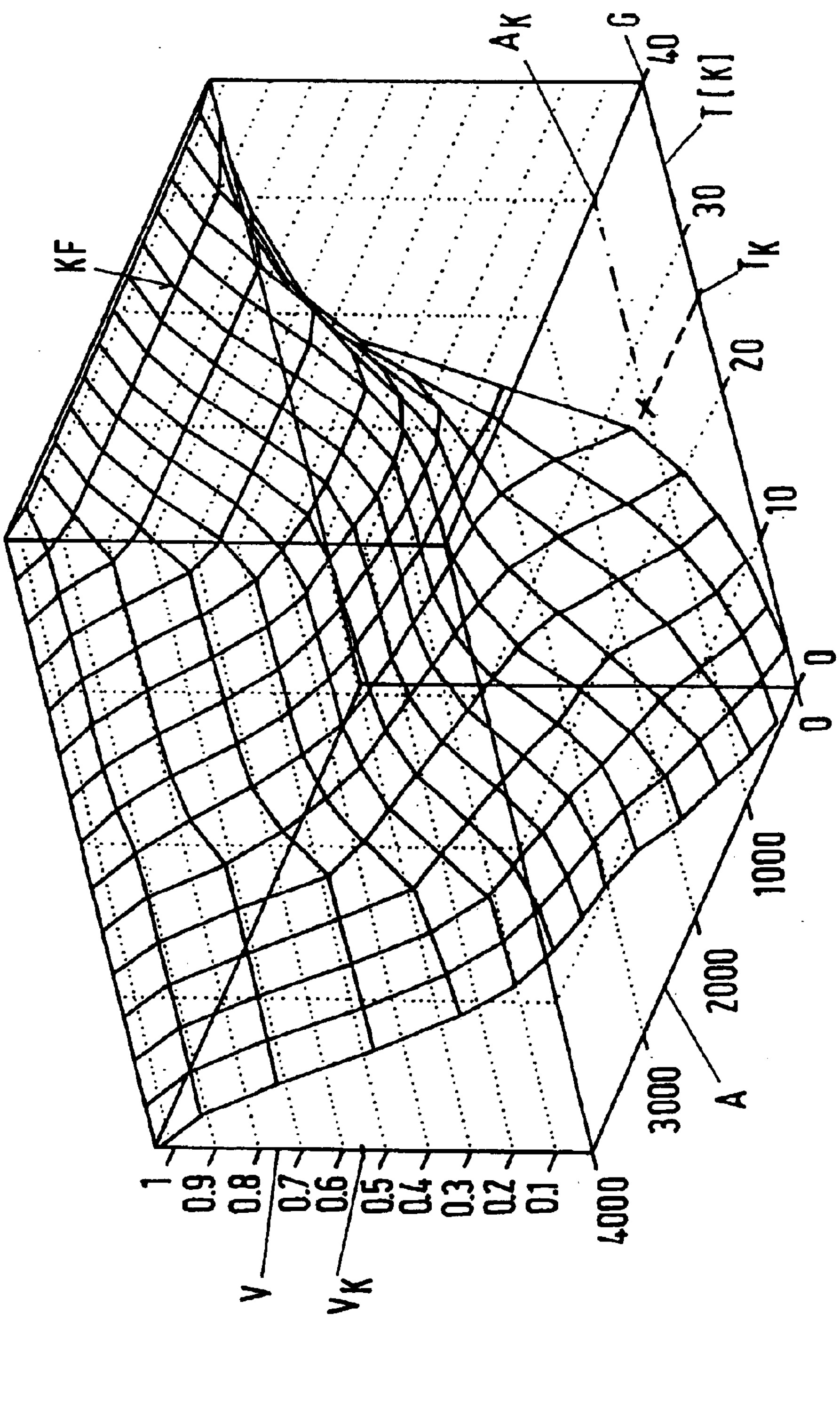
FIG. 3 shows a code field in a three-dimensional space which is set up by the A axis, the T axis and the V axis.

A code field KF can then be established from this information, as is shown as a mesh in FIG. 3. It is naturally possible, and normally also usual, for initially a first "draft" to be established for the code field KF and for this then to be fine tuned. Such fine tuning operations can take place, for example, by trial and error, by taking measurement data into account, by manual remodelling on the basis of plausibility observations (e.g. that the margin of the code field lies on the line with T=40 K and V=1) or by other optimization or calibration methods. The code field KF resulting from this for the embodiment described here is shown in FIG. 3.

With the aid of this code field KF, which describes the relationship between the temperature increase T, the number of flights A and the wear V, the estimate of the residual service life is now carried out during the life cycle of the engine, which will be described in the following.

During the life cycle of the engine, technical measurement data of the engine are detected—for example on or after each flight—from which actual values are then determined for the characteristic parameter (here the temperature increase T) in dependence on the time parameter (here the number A of flights). It is naturally also possible, and on occasion also advantageous, to use the data detected directly in a technical measurement as the actual values depending on the specific application; in the present embodiment, however, it has proven to be advantageous to subject the data obtained by a technical measurement to a filtering or an averaging. The reason for this is that the change in the gas discharge temperature T is overlaid by a strong noise due to the high absolute value of the gas discharge temperature. A typical noise amplitude can amount to half or even more of the data signals obtained by a technical measurement.

Basically, a very large number of processes and methods known per se are naturally suitable to subject the data obtained by a technical measurement to an averaging or to a filtering. A possibility is explained which uses a method which is described in EP-A-0 895 197.

The change in the gas discharge temperature T is obtained by a technical measurement at regular intervals, that is, on every flight, for example. This results in a data set of the form $[T_i; A_i]$, with i=1, . . . , n, where $t_i$ is the temperature change for the flight with the number $A_1$. Part of this data set, for example the data with i=1, 2, . . . , 20; the data with i=21 22, . . . , 40; etc., is now in each case used to establish a model. This results in a plurality of models. Each of these models is then evaluated for the same state, the so-called nominal state in order to determine in this manner the actual values for the characteristic parameter. Reference is made to EP-A-0 895 197 with respect to further details.

An averaging of the data obtained by a technical measurement takes place by this measure which substantially reduces the noise amplitude. In this manner, actual values can be determined for the temperature increase T in dependence on the number A of flights.

The historic measurement data or the actual values for the temperature increase T up to the present are available for the engine at the time at which the estimate of the residual service life should take place. A point in the plane set up by the A axis and the T axis (see FIG. 3) corresponds to each value pair $(T_k, A_k)$ from an actual value for the temperature increase and the associated service life, measured by the number of flights $A_k$. For reasons of better clarity, only one such point is drawn as a cross in FIG. 3 with the coordinates $(T_k, A_k)$ in the T-A plane. This point is now projected onto the code field KF, that is—in accordance with the representation—upwardly onto the code field represented by the mesh KF. Then the wear $V_k$ associated with $(T_k, A_k)$ can be read off directly.

Figure 4:
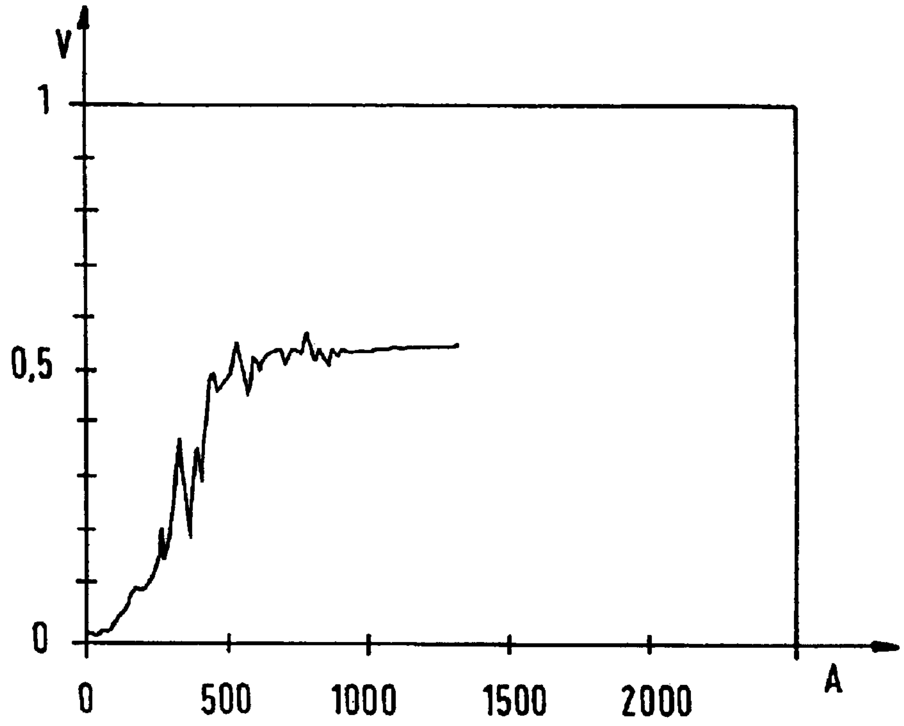
FIG. 4 is a projection of historic data into the plane which is set up by the A axis and the V axis.

As already mentioned, all value pairs $(T_k, A_k)$ up to the present are known. If each value pair is imaged onto the code field KF and if the result is projected onto that plane which is set up by the A axis (number of flights) and the V axis (wear), the curve shown in FIG. 4 results, for example. It describes the quantified wear V for all historic data in dependence on the already used up lifetime, measured by the number A of flights. In the specific example, approximately 1300 flights have been made at the current point in time and the wear lies at approximately 55%.

An extrapolation to the limit value G for the temperature increase T now takes place for the prediction of the future course of the wear V and thus for the estimate of the residual service life. There are naturally numerous possibilities for an extrapolation. The selection of a suitable extrapolation depends on the specific application. Consideration must in particular be taken of how conservative the estimate may or should be, that is, how high specifications on the security of the forecast must be made. Accordingly, more or less pessimistic developments can be taken into account in the extrapolation and computed by the extrapolation.

In very sensitive applications, such as in the present case of an airplane engine, for example, one will work with more pessimistic forecasts in order to have sufficient safety reserves and to preclude a reaching of the wear limit prior to the end of the estimated residual service life.

In the embodiment described here, a pessimistic development of the temperature increase can be derived over the number of flights, which are normally at least required to reach the limit value G=40 K for the temperature increase T. It can be estimated, for example with reference to such wear curves K1–K4, such as are shown in FIG. 1, what is the minimum number A of flights up to the reaching of the limit value. This minimum number is given in FIG. 1 by the point where the wear curve K1 reaches the limit value.

The minimum number of flights results at 2000 flights from the data underlying the code field KF in FIG. 3.

Figure 5:
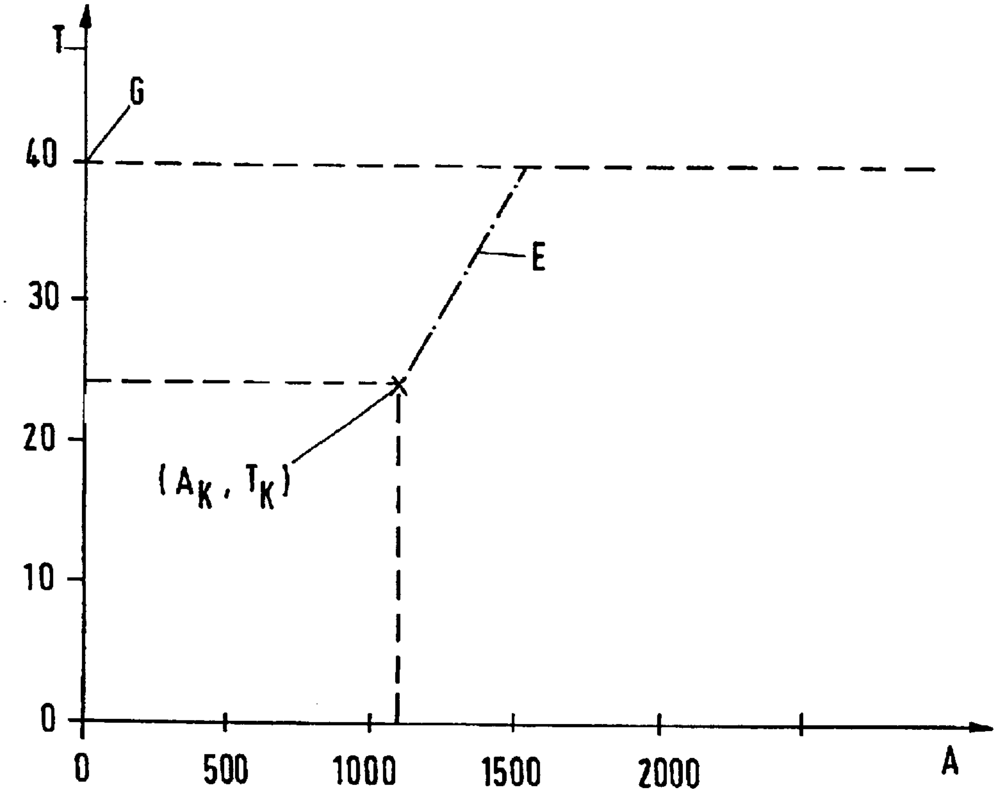
FIG. 5 is a presentation of the A-T plane for the illustration of an extrapolation in an embodiment of a method in accordance with the invention.

The procedure is now as follows with respect to the extrapolation. FIG. 5 shows the plane which is set up by the A axis and the T axis. As already in FIG. 3, only one point ($A_k$, $t_k$) is drawn. Let this be the most recent point, that is, that point which corresponds to the present in which the estimate is made. From this point, as is shown by the chain dotted line E, an extrapolation is made in a linear manner to the limit value G=40 K for the temperature increase T. The gradient with which the line E is "attached" to the point $T_k$, $A_k$ has been determined as follows. Starting from the fact that the minimum number of flights to reach the limit value G of the temperature increase T amounts, as mentioned above, to A=2000 flights, the associated increase is determined which results when the points T=0, A =0 (new state) and T=40 L, A=2000 flights are connected to one another by a straight line. The gradient resulting from this is then reduced again for safety reasons. In the present case it was halved; that is, it was assumed that the limit value is already reached after half the number of flights. The extrapolation resulting from this is the line E shown in FIG. 5.

Figure 6:
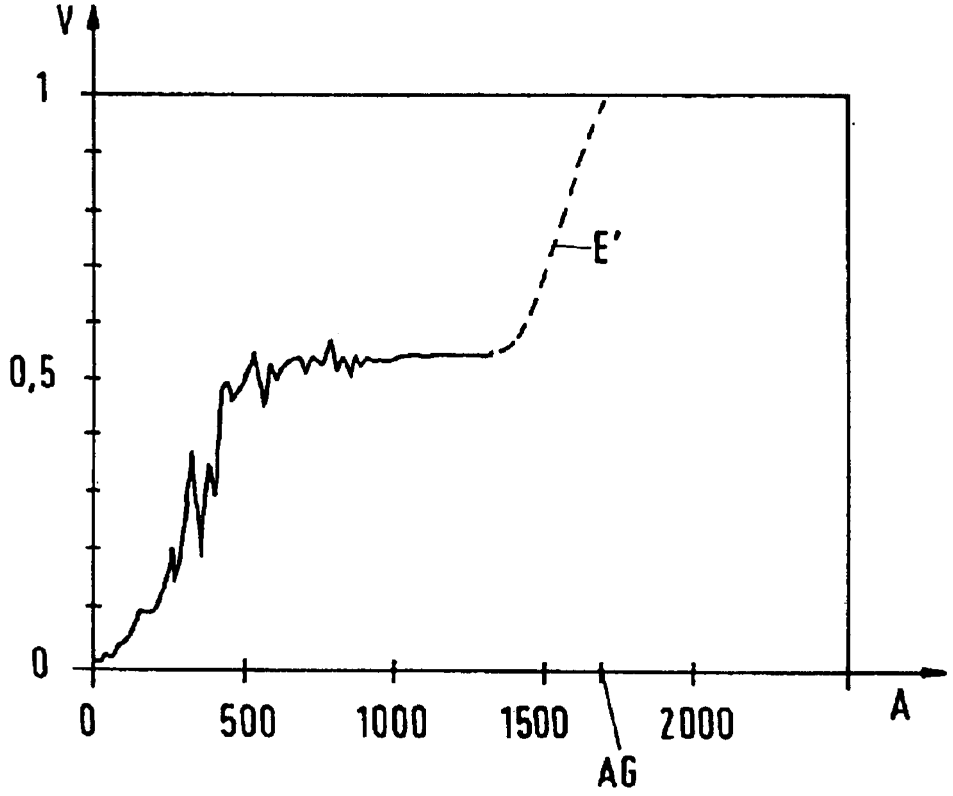
FIG. 6 is similar to FIG. 4, but additionally with the projection of an extrapolation.

In the next step, the line E is shown in the code field KF, whereby it generally becomes a curved line. If the code field KF is now again projected—analogously to the representation in FIG. 4—onto the plane set up by the V axis and by the A axis, the representation shown in FIG. 6 results. In addition to the historic values (which are naturally identical to those in FIG. 4), the projection E' of the extrapolation can now also be seen which is shown in a chain dotted manner. The projection E' of the extrapolation reaches the wear limit V=1 after a number of flights which is designated by AG as the end value. The estimate of the residual service life now results by forming the difference between the end value AG and the current value for the number of flights, that is, the latest of the historic values. In FIG. 6, this is the last point of the continuous curve.

This method for the estimating of the residual service life is now repeated constantly or at pre-settable intervals during the service life of the engine. The prediction horizon is substantially defined by the choice of the gradient. The choice of a reasonable gradient has to take place in an application-specific manner.

Figure 7:
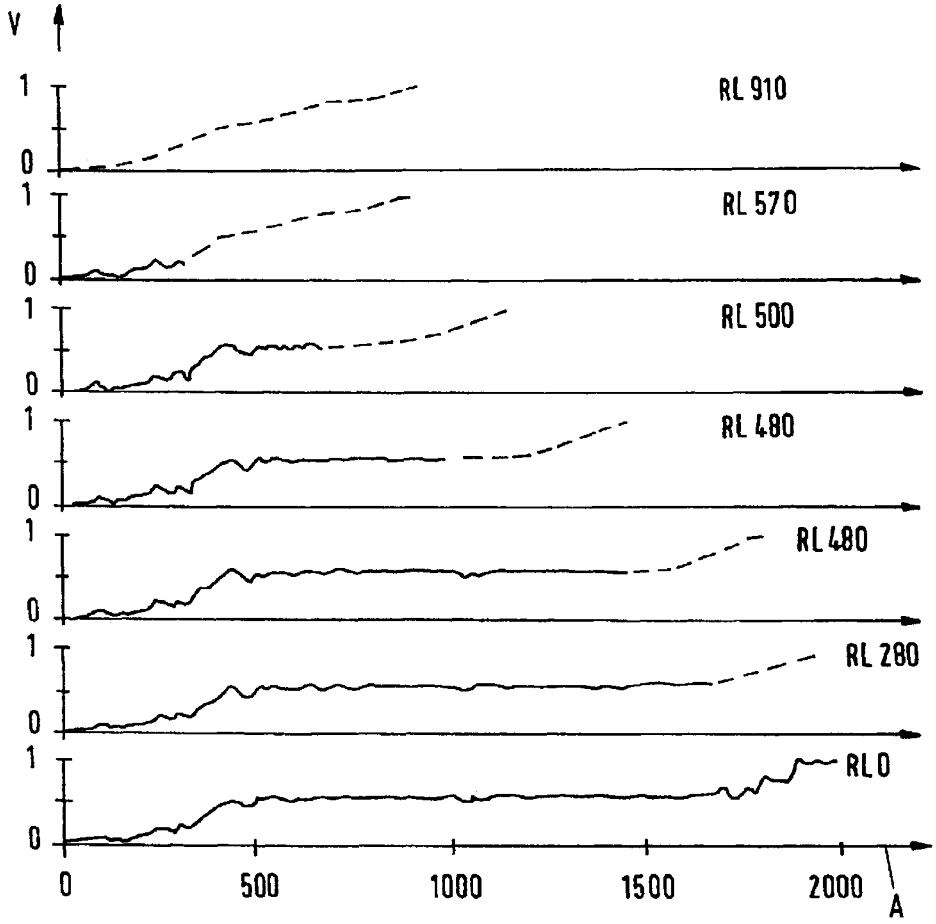
FIG. 7 includes a plurality of representations, in each case as in FIG. 6, however, at different times in the life cycle, for the illustration of the respective estimate of the residual service life in accordance with the method of the invention.

For better understanding, FIG. 7 illustrates the estimating of the residual service life for seven stages in the life cycle of an engine. In each of the applications in FIG. 7 the plane is shown, in each case in the same manner as in FIG. 4 and in FIG. 6, which is set up by the V axis and the A axis and which results by projection of the code field. The historic data, that is, those data which are based on data obtained by a technical measurement, are each shown as continuous lines; the extrapolations which underlie the estimate are shown in a chain dotted manner. The transition from the continuous to the chain dotted line therefore gives the respective present in which the estimate took place. The estimated residual service life RL can be seen in number of flights in each case to the right next to the representations. In the topmost representation, in which no historic data are yet present, the residual service life is substantially defined by the chosen gradient.

In the second to fifth figures, seen from the top, a residual service life of approximately 500 flights is always forecast. This means that the airplane operator receives the information after, for example, 650 flights (third figure) that at least 500 flights are still possible up to the next service. After approximately 1000 flights (fourth representation), the operator receives the information that at least 480 flights are still possible. After somewhat more than 1300 flights (fifth representation), the operator again receives the information that 480 flights are still possible. These forecasts in the second to fifth representations are also substantially defined by the prediction horizon and thus by the choice of the gradient.

Only in the sixth representation (sixth estimate) does the end of the life cycle emerge so that the operator can now initiate the audit planning. Due to the selected gradient for the extrapolation, the emerging end of the life cycle can be recognized approximately 500 flights before reaching the wear limit. If this is related to the whole life cycle of approximately 2000 flights, substantial free room for action of approximately 25% of the life cycle remains for the operator.

The prediction horizon can admittedly be expanded or extended by selection of a smaller gradient for the extrapolation. This would, however, not result in a much larger benefit in practice, but would increase the risk of too optimistic an estimate of the residual service life.

It becomes possible by the estimating of the residual service life of the airplane engine which is described here and which takes the quantified wear into account to use the potential of the engines substantially more efficiently, without compromises in the operating safety being required. The total service or audit planning can be optimized, whereby an economically much more favorable operation is made possible. The method in accordance with the invention can thus in particular be used advantageously for the service planning on airplane engines. This also makes a much more efficient planning of the service work possible for a plurality of airplanes. The method in accordance with the invention consequently makes an extremely high performance fleet management of a whole fleet of airplanes possible.

The type of extrapolation described above is only to be understood as an example. Different kinds of extrapolation, e.g. non-linear extrapolations or extrapolations based on qualitatively known developments, can also be used. The specific choice of an extrapolation matched to the respective application does not present the person skilled in the art with any problems.

Even if, in the specifically described preferred embodiment for the determination of the code field, a linguistic fuzzy model is used for the processing of a-priori know-how, the invention is not restricted to such modelling processes.

It is also not necessarily the case that the code field must be established by means of a-priori know-how. Other methods are also possible to determine a code field which gives the relationship between the characteristic parameter, the time parameter and the wear. For instance, depending on the application, for example ab-initio computations can be carried out, or interpretation calculations, dimensioning calculations, physical modelling processes, data supported modelling processes, or system behavior computations. Furthermore, it is possible to describe the code field in the form of polynomials, look-up tables, multi-layer perceptrons (neuronal networks), radial basis functions, Singleton and Takadi-Sugeno fuzzy models as well as Hinging hyperplanes.

It is also possible to use more than one characteristic parameter sensitive to the wear, whereby the code field is defined in a higher dimensional space.

What is claimed is:

1. A method for the estimating of the residual service life of an apparatus which is subjected to a wear during operation, with the following steps:

a) for at least one characteristic parameter (T) which is sensitive to the wear (V), a relationship is determined to a time parameter (A) which is representative for the operating period;

b) a limit value (G) is fixed for the characteristic parameter (T) which gives the maximum permitted wear;

c) a code field (KF) is established which gives a relationship between the characteristic parameter (T), the time parameter (A) and the wear (V);

d) actual values are determined for the characteristic parameter (T) in dependence on the time parameter (A) with the aid of data obtained by a measurement;

e) the instantaneously present wear (V) is determined from the actual values with reference in each case to the code field (KF);

f) starting from the instantaneous actual value of the characteristic parameter (T), a determination is made by means of extrapolation to the limit value (G) of the end value of the time parameter (A) for which the maximum permitted wear is reached;

g) the residual service life (RL) is estimated by a comparison of this end value with the value for the time parameter which belongs to the instantaneously present wear.

2. A method in accordance with claim 1, in which the code field (KF) is established with the aid of a-priori knowledge of the wear behavior.

3. A method in accordance with claim 2, in which the a-priori knowledge includes the qualitative and/or quantitative course of wear curves (K1, K2, K3, K4) which give the relationship between the characteristic parameter and the time parameter.

4. A method in accordance with claim 1, in which the code field (KF) is established by means of a linguistic fuzzy model.

5. A method in accordance with claim 1, in which the code field (KF) is modified with reference to measurement data or on the basis of plausibility observations.

6. A method in accordance with claim 1, in which the code field (KF) represents an area in a three-dimensional space which space is set up by the characteristic parameter (T), the time parameter (A) and the wear (V).

7. A method in accordance with claim 1, in which the data obtained by a measurement is subjected in each case to a filtering or an averaging for the determination of the actual values for the characteristic parameter.

8. A method in accordance with claim 1, in which a model is established with the aid of a plurality of sets of data obtained by a measurement, with which model an actual value is determined for the characteristic parameter.

9. A method in accordance with claim 1, in which the apparatus is an engine, in particular an airplane engine.

10. Use of a method in accordance with claim 1 for the service planning, in particular of an airplane or of a plurality of airplanes.

* * * * *